Jan. 29, 1957 N. E. LINDENBLAD 2,779,171
ROOM TEMPERATURE CONDITIONER
Filed Jan. 4, 1954
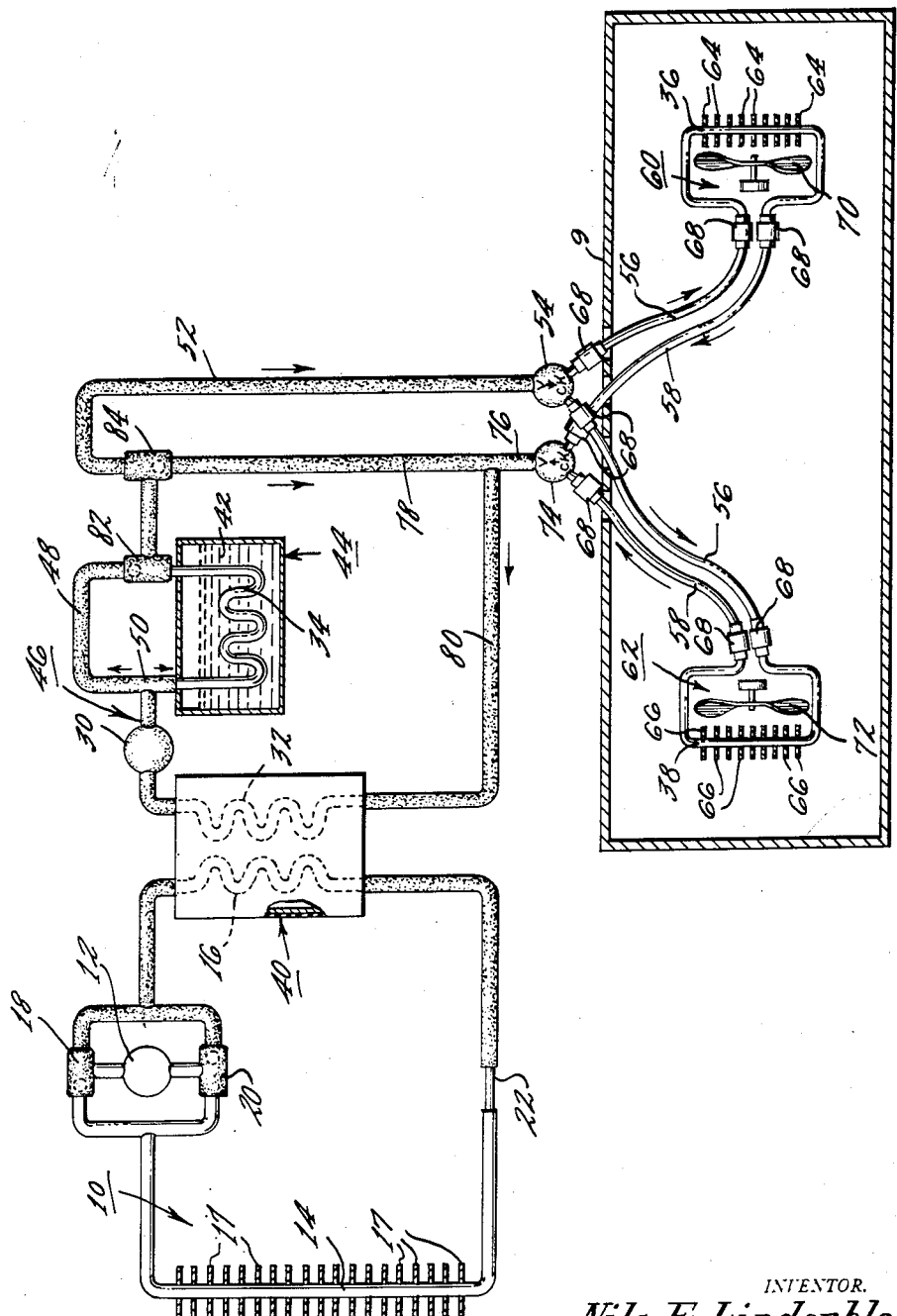
INVENTOR.
Nils E. Lindenblad
BY
ATTORNEY

United States Patent Office 2,779,171
Patented Jan. 29, 1957

2,779,171
ROOM TEMPERATURE CONDITIONER

Nils E. Lindenblad, Princeton, N. J., assignor to Radio Corporation of America, a corporation of Delaware Application January 4, 1954, Serial No. 401,798

3 Claims. (Cl. 62—129)

This invention relates to a novel system and apparatus for heating and cooling an enclosure, and, more particularly, to a novel thermal conditioning system utilizing a secondary fluid circulating system.

Known window type room air conditioners are inconvenient in some respects. They interfere with the normal use of the window in which they are installed. The compressor of a window type air conditioner vibrates and is noisy. This noise and vibration is particularly disturbing in sleeping quarters. The temperature of the room is maintained with difficulty because known units operate either completely on or completely off. The units are quite heavy since they include a complete refrigeration system, and cannot be easily moved from one location to another should it be so desired. The present invention provides a system which is free of noise and vibration for uniformly cooling, and can be easily moved from one location to another. One unit may therefore be utilized in any one of a number of adjoining rooms.

The principal object of this invention is to provide a quiet flexible thermal conditioning apparatus.

Another object is to provide a thermal conditioning apparatus of the aforementioned type which may be easily controlled to maintain a substantially constant room temperature.

A further object is to provide a thermal conditioning apparatus which may be easily and economically installed.

A still further object is to provide a thermal conditioning system which does not interfere with the normal use of windows.

A still further object is to provide room temperature conditioning apparatus which may be easily transferred from one room to another.

The illustrative example of the present invention, described herein, includes a closed primary refrigerating system, a secondary fluid circulating system and a heat storage element. The primary refrigerating system is located outside of the space or compartment to be thermally-conditioned. The secondary fluid circulating system is located partially outside the enclosed compartment and partially within the enclosed compartment. The primary refrigerating system absorbs heat from the secondary system through a heat exchanger. A heat storage unit is installed in heat exchange relationship with the secondary system in a location which also may be outside the compartment. Various lightweight portable heat exchange or heat absorbing elements are provided within the enclosure. These heat absorbing elements are connected as part of the secondary fluid system by means of lengths of supple tubing.

The primary refrigerating system cools a liquid such as brine circulating in the secondary system. The brine circulates through the heat storage unit and through the heat absorbing units located with the enclosure. Valves are provided to proportion the flow of brine between the heat storage unit and the heat absorbing units. The flow within the enclosure can be regulated by means of these valves to maintain a substantially constant temperature. When the cooling capacity is not fully utilized, the cool secondary fluid may be channeled to the heat storage unit where it cools or even freezes a quantity of water. The lightweight heat absorbing units may be easily moved to various points within the enclosure or even to separate rooms within the enclosure while still connected as part of the secondary fluid system by the lengths of supple tubing. Inexperienced personnel may install the central unit and quickly and easily connect the heat absorbing units by means of the supple tubing.

Other objects and advantages of the present invention will become apparent to those skilled in the art from a reading of the following specification in conjunction with the accompanying drawing, the single figure thereof being a schematic diagram of an illustrative embodiment of this invention.

In the diagram, a primary refrigerating system 10 includes a compressor 12 and heat exchange elements 14 and 16. Compressor valves 18 and 20 may be adjusted to operate the system as either a heat absorbing or a heat supplying system. When operated as a heat absorbing refrigerating system, the heat exchange element 14 may be called a condenser; and the heat exchange element 16 may be described as an evaporator. Fins 17 are provided on the condenser to increase its heat transfer area. The valves 18 and 20 can be set in a reverse arrangement to reverse the function of the heat pump to have it operate as a heat supplying pump rather than the heat absorbing pump. A capillary tube flow restrictor 22 is provided in the line between the heat exchange elements to help in volatilizing the refrigerant.

The pump 30 circulates the secondary fluid through the secondary fluid system. A low freezing temperature liquid such as brine may be used as the secondary fluid. The system includes heat exchange elements 32 and 34 outside of the compartment and heat exchange or heat absorbing elements 36 and 38 within the compartment. Remote brine systems may be used where building codes may prohibit extensive volatile refrigerant piping. The secondary fluid system is linked with the primary refrigerating system by means of the heat exchanger 40. Within the heat exchanger 40, heat exchange element 16 of the primary system and heat exchange element 32 of the secondary system are linked in heat exchange relationship.

Heat exchange element 34 of the secondary system is immersed in a liquid 42 within heat storage unit 44. The liquid may be water or any liquid which will readily absorb or give off heat supplied or rejected by the secondary system. The liquid is most effective in heat storage ability when its freezing point is higher than that of the secondary fluid. The ability to freeze the storage liquid makes its high latent heat storage capacity available. Within the enclosure 9, the secondary system heat absorbing units 36 and 38 are disposed in heat exchange relationship with the atmosphere within the enclosure. These heat exchange units when the compressor is reversed may also be used to supply heat to the enclosure.

In a broad sense, the term "located within the enclosure" may be considered as implying that the unit is in heat exchange relationship with the atmosphere of the enclosure. With this limitation in mind, the only units that may not be physically disposed within the enclosure are the compressor and the heat exchange element 14. This heat exchange element must be disposed to absorb heat from or reject heat to a source or sink. It is preferable that the heat exchanger 40 and the heat storage unit 44 be also located outside the enclosure as they may be fairly large units. If located within the enclosure, they may have to be very heavily insulated.

Piping 46 is provided to circulate the secondary fluid through the secondary system. With the exception of the piping from the compressor through the condenser and up to the capillary tube, all the piping is insulated. This keeps the brine cold until it reaches the area to be cooled. Parallel branches formed by pipes 48 and 50 are provided to separate the flow of fluid into two branches. One branch flows through the heat absorbing element 34 located within the heat storage unit 44, and the other branch flows through pipe 52 to the manifold 54. The manifold 54 includes a check valve so that fluid can only flow through it in the direction indicated by the arrow. From the manifold 54, the fluid is distributed through supple tubes 56 and 58 to the lightweight heat absorbing units 60 and 62. These heat absorbing units 60 and 62 include, respectively, the heat absorbing elements 36 and 38 of the secondary fluid circulating system. Fins 64 and 66 are provided on elements 36 and 38, respectively, to increase the heat transfer area between the heat absorbing elements and the atmosphere of the enclosure.

The supple tubes may be made of an elastic material, for example, rubber. The tubing may be preferably made of heat insulating material to prevent the secondary fluid from warming up before it arrives at the heat absorbing unit. Other material such as plastic or flexible glass may be used. The tubing must be supple enough to allow the unit to be moved to various locations with the room and even through a doorway to an adjacent room. The unit may be therefore used in the living quarters during the day and moved to the sleeping quarters during the evening.

The supple tubing is joined to the heat absorbing units and central secondary system cold fluid supply system through couplings 68. These couplings may be of the quick detachable self-sealing type so that the units may be detached from the tubing for movement to another location. The combination of the supple tubing and the detachable self-sealing couplings provides an extremely flexible cooling arrangement. An unskilled workman may easily install the central package unit and quickly connect the remote heat absorbing units by means of the conveniently coupled supple tubing. The suppleness of the tubing allows it to be installed inconspicuously and easily throughout a house. Motor driven fans 70 and 72 are provided in the heat absorbing units 60 and 62 respectively to circulate the atmosphere of the enclosure through the unit. Since the heaviest and bulkiest part of the system is located in a central location outside of the enclosure, the heat absorbing units themselves may be very light and easily moved about from room to room.

The secondary fluid after flowing through the heat absorbing elements, flows in the direction indicated by the arrows into the manifold 74. A check valve is installed in the manifold to permit flow only in the indicated direction. From the return manifold the secondary fluid from the enclosure flows through pipe 76 to merge with the fluid flowing from the heat storage unit through pipe 78. The merged warm fluid flows through pipe 80 back into the heat exchanger 40 where it is recooled.

Valves 82 and 84 are provided in the secondary fluid supply lines to proportion the flow between the heat storage unit and the bypassing pipe 48. The valves may be set to provide a rate of flow through the room enclosed heat absorbing units to maintain the temperature of the enclosure substantially constant. When the flow demand in the room is light, practically all of the fluid may be circulated through the heat storage unit to build up a reserve supply of cooled water or ice which can be drawn upon during high demand periods. During high cooling demand periods, the valves can be adjusted to pass the secondary fluid through the heat storage unit before the fluid is circulated in the room. At these times, the heat storage unit will further cool the secondary fluid which is then used to cool the room.

The user is therefore provided with an extremely flexible system as respects the direction of heat transfer, the storage of heat or heat absorbing ability and the location of the ultimate heat transfer units. The system may be used in winter to evenly heat the enclosure and in summer to evenly cool it. In winter, the liquid within the heat storage unit may be tapped to provide hot water for washing purposes. The noisy and bulky components are all located outside of the enclosure. For example, they may be located in the cellar of a building. The ultimate heat exchange units may be conveniently moved to the most desirable location with the "enclosure." By enclosure is meant not only a single room, but may be defined as a home divided into a number of separate rooms. Flexible connections to the system may be provided in each of these rooms so that the room conditioning units may be conveniently moved to the individual room where they are required. The home may, therefore, be heated or cooled with the minimum of equipment and with a minimum of power consumption.

What is claimed is:

1. A thermal conditioning system for an enclosed compartment comprising a heat pump system including a compressor and heat exchange elements, one of said heat pump system heat exchange elements being located outside of said compartment, a secondary fluid circulating system including a circulator and heat exchange elements, one of said secondary fluid system heat exchange elements being disposed in heat exchange relationship with one of said heat pump system heat exchange elements, a heat storage element, one of said secondary fluid circulating system heat exchange elements being disposed in heat exchange relationship with said heat storage element, another of said secondary fluid system heat exchange elements being portable and being enclosed within said compartment, and supple tubing, said portable heat exchange element being connected as a part of the secondary fluid system by means of said supple tubing.

2. A cooling apparatus for an enclosed compartment comprising the combination of a refrigerating system including a compressor, a condenser and an evaporator, said condenser being located outside of said compartment, a secondary fluid circulating system including a circulator and heat exchange elements, said evaporator being disposed in heat exchange relationship with one of said secondary fluid heat exchange elements, a heat storage element, one of said secondary fluid heat exchange elements being disposed in heat exchange relationship with said heat storage element, another of said secondary fluid heat exchange elements being portable and being enclosed within said compartment, said portable heat exchange element being disposed in heat exchange relationship with the atmosphere within said compartment, and supple tubing, said portable heating element being connected as a part of said secondary fluid circulating system by means of said supple tubing.

3. An easily installed cooling apparatus for an enclosed compartment comprising the combination of a primary refrigerating system disposed outside of said compartment, a secondary fluid circulating system including heat absorbing elements partially disposed outside said compartment, a heat storage element disposed outside said compartment, said refrigerating system being disposed in heat exchange relationship with said secondary fluid circulating system, said secondary fluid circulating system being disposed in heat exchange relationship with said heat storage element, one of said heat absorbing elements being portable and being enclosed within said compartment, supple tubing, said portable heat absorbing element communicating through a wall of said compartment with said secondary fluid circulating system by means of said supple tubing.

References Cited in the file of this patent

UNITED STATES PATENTS

| | | |
|---|---|---|
| 1,891,713 | Jordan | Dec. 20, 1932 |
| 1,896,953 | Hassell | Feb. 7, 1933 |
| 1,969,187 | Schutt | Aug. 7, 1934 |
| 1,988,549 | Gibson | Jan. 22, 1935 |
| 2,075,225 | Post | Mar. 30, 1937 |
| 2,296,725 | McEwan | Sept. 22, 1942 |
| 2,342,566 | Wolfert | Feb. 22, 1944 |
| 2,493,378 | Alvarez | Jan. 3, 1950 |
| 2,504,308 | Donkle | Apr. 8, 1950 |
| 2,518,299 | Fernandez | Aug. 8, 1950 |